(12) United States Patent  (10) Patent No.: US 8,758,544 B2
Kovach et al.  (45) Date of Patent: Jun. 24, 2014

(54) METHOD AND APPARATUS FOR FORMING A VEHICLE WINDOW ASSEMBLY

(75) Inventors: David Kovach, Blissfield, MI (US); Charles Sitterlet, Northwood, OH (US)

(73) Assignee: Pilkington Group Limited, St. Helens (GB)

( * ) Notice: Subject to any disclaimer, the term of this patent is extended or adjusted under 35 U.S.C. 154(b) by 24 days.

(21) Appl. No.: 13/276,535

(22) Filed: Oct. 19, 2011

(65) Prior Publication Data

US 2012/0103512 A1   May 3, 2012

Related U.S. Application Data

(60) Provisional application No. 61/407,937, filed on Oct. 29, 2010.

(51) Int. Cl.
 *B32B 37/02* (2006.01)

(52) U.S. Cl.
 USPC ..................................... 156/275.5

(58) Field of Classification Search
 USPC ............... 156/272.2, 273.7, 275.5, 66, 285
 See application file for complete search history.

(56) References Cited

U.S. PATENT DOCUMENTS

| | | | |
|---|---|---|---|
| 3,816,690 A | 6/1974 | Mittelmann | |
| 4,017,701 A | 4/1977 | Mittelmann | |
| 4,032,740 A | 6/1977 | Mittelmann | |
| 4,128,449 A | 12/1978 | Kobetsky | |
| 4,139,408 A | 2/1979 | Kobetsky | |
| 4,163,884 A | 8/1979 | Kobetsky | |
| 4,163,885 A | 8/1979 | Kobetsky | |
| 4,167,259 A | 9/1979 | Bury | |
| 4,364,595 A * | 12/1982 | Morgan et al. | 296/96.11 |
| 4,668,546 A * | 5/1987 | Hutter, III | 428/41.8 |
| 5,414,247 A * | 5/1995 | Geithman et al. | 219/667 |
| 5,665,397 A | 9/1997 | Fisher et al. | |
| 6,031,211 A * | 2/2000 | Mailho et al. | 219/486 |
| 6,288,375 B1 | 9/2001 | Lappi et al. | |
| 6,323,468 B1 | 11/2001 | Dabelstein et al. | |
| 6,849,837 B2 | 2/2005 | Riess et al. | |
| 7,002,117 B2 | 2/2006 | Thomasset | |
| 2003/0024183 A1* | 2/2003 | Burnside et al. | 52/208 |
| 2008/0164248 A1 | 7/2008 | Reul | |

FOREIGN PATENT DOCUMENTS

| | | |
|---|---|---|
| EP | 0479643 A1 | 4/1992 |
| GB | 957385 | 5/1964 |
| WO | WO2004/101319 A1 | 11/2004 |

* cited by examiner

*Primary Examiner* — Daniel McNally
(74) *Attorney, Agent, or Firm* — Marshall & Melhorn, LLC

(57) ABSTRACT

A method and apparatus for forming a vehicle window assembly utilizes one or more induction heating devices to adhesively bond an item of hardware to a glass substrate, which substrate is then adapted to fill an opening in a vehicle body. Preferably, the induction heating device(s) and one or more assembly aids are components of an assembly fixture which allows for automated or semi-automated production of such vehicle window assemblies.

14 Claims, 7 Drawing Sheets

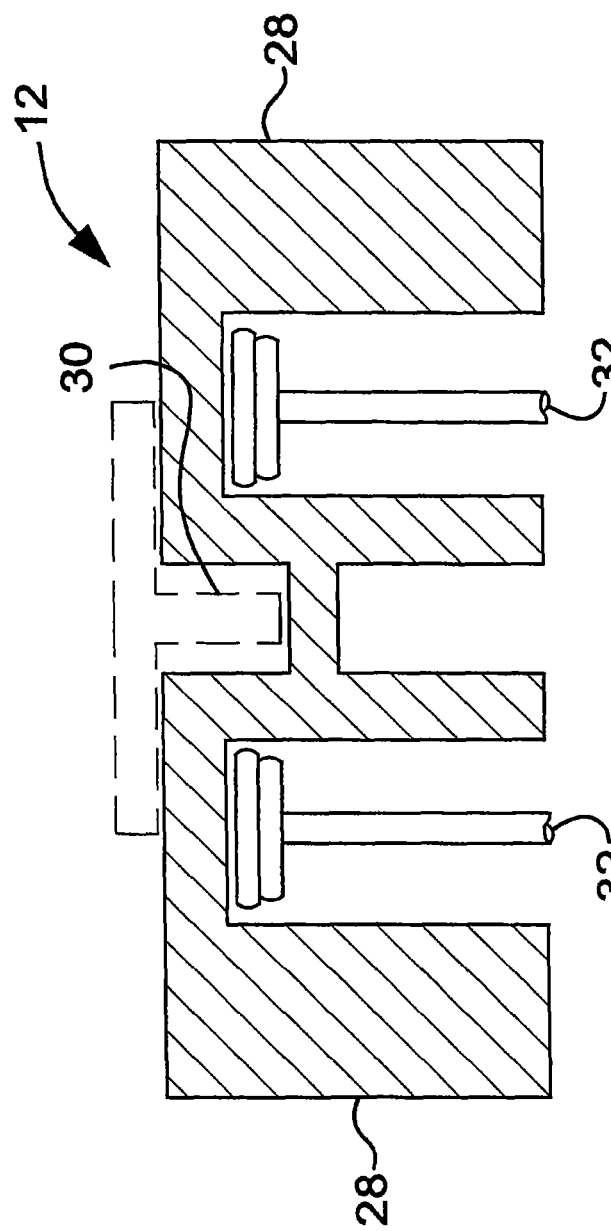

METHOD AND APPARATUS FOR FORMING A VEHICLE WINDOW ASSEMBLY

RELATED APPLICATION

This application is claiming the benefit, under 35 U.S.C. 119(e), of the provisional application filed Oct. 29, 2010 under 35 U.S.C. 111(b), which was assigned Ser. No. 61/407,937. This provisional application is hereby incorporated by reference.

BACKGROUND OF THE INVENTION

The present invention relates to an apparatus for forming a vehicle window assembly, and the method of using such apparatus to form such vehicle window assembly. More particularly, the invention relates to one or more apparatus and the method(s) of utilizing same to dispose one or more items of hardware onto a dielectric substrate to form a vehicle window assembly.

Induction heating for various types of bonding has been described in the patent literature, for example:

U.S. Pat. No. 6,288,375 describes an induction heating apparatus and method for heating a substantially continuous bondline defined by a length of thermally responsive bonding material positioned between a first member and a second member. The inductive heating apparatus includes a flexible, reshapeable cable assembly positionable adjacent the first member along the first bondline. The flexible, reshapeable cable assembly is capable of being manually shaped to a first shape of the first bondline, and then being manually reshaped to a second shape of a second bondline different than the first shape of the first bondline.

U.S. Pat. No. 6,323,468 describes a static coil induction welding apparatus and method for induction welding thermoplastic composite structures. The apparatus includes a plurality of independent coil segments disposed adjacent one another in side-by-side fashion to form a coil pack. A plurality of such coil packs are disposed in side-by-side fashion to form a coil assembly which covers the entire area of the weld zone. An AC power supply associated with each coil pack applies an AC signal through a switching network to electrically energize its associated coil segments such that the AC signals are in predetermined phase relationships relative to one another, thus generating a plurality of eddy current loops in a susceptor placed between the components being welded. The switching network alternately switches the coil segments such that the AC signals applied to the coil segments are shifted back and forth between adjacently disposed coil segments repeatedly approximately every 0.5 seconds. This produces a back and forth lateral shifting of the induced eddy current loops by about one-half the width of one current loop to provide uniform heating of the susceptor. It is also said to eliminate various drawbacks associated with dynamic coil induction welding systems, and to allow feedback control over the power applied to each coil pack.

U.S. Pat. No. 6,849,837 describes a method for using magnetic fields to heat magnetically susceptible materials within and/or adjacent to adhesives so as to bond, bind or fasten solid materials to one another. The system uses alternating magnetic fields that induce eddy currents and generate heat within susceptors. An induction heating tool is used to emit the magnetic field at its work coil and an electronic controller measures the energy being used by a power converter that generates the alternating current driving the work coil which creates the magnetic field.

U.S. Published Patent Application No. 2008/0164248 describes a method and device for simultaneously soldering plural electrical connections in which contact elements have to be soldered to soldered-connection faces positioned on a non-metallic glazing. A soldering tool is used to emit a magnetic field toward the solder spots to heat them by induction. The size and shape of the soldering tool corresponds to the surface area over which the plural solder spots to be simultaneously heated in the soldering operation are situated. Additionally, the frequency of the AC voltage applied to the loop or coil is matched to the connection geometry but will be a maximum of 150 KHz.

U.S. Pat. No. 7,002,117 describes a device for welding a moving packaging material including a layer that can be heated by electromagnetic induction and a thermoplastic layer incorporating a welding zone which lies in the direction of movement of the packaging material; the welding device includes an alternating current generator, a coil for transforming the alternating current into a magnetic field, a ferromagnetic element for channeling the magnetic field lines in a specific direction, the magnetic field being oriented so as to cross the packaging material in order to induce heating of the layer that can be heated by electromagnetic induction; the welding device being characterized in that it includes a set of ferromagnetic elements which are arranged so that the magnetic field lines cross the packaging material in at least two distinct regions located along the welding zone. By use of such a device, the packaging is said to undergo, in the welding zone, a first heating followed by an interruption and a second heating.

SUMMARY OF THE INVENTION

In today's vehicle manufacturing environment, more than ever, the vehicle manufacturers expect from their suppliers a technologically advanced, high quality product at low cost, that can be readily installed in a vehicle body opening on the vehicle assembly line, with a minimum of effort by vehicle assembly line workers. As more items of hardware, serving various purposes, are disposed on vehicle windows to satisfy the above-noted vehicle manufacturer requirements, it is necessary for the vehicle window assembly supplier to provide a vehicle window assembly on which items of hardware are robustly attached, without penetrating the vehicle window, and are precisely positioned for easy assembly.

To accomplish the previously described objectives in a cost-effective manner, the vehicle window assembly supplier seeks a flexible process, which can produce high-quality vehicle window assemblies in a short cycle time.

The present invention satisfies the foregoing objectives of the vehicle manufacturer and the vehicle window assembly supplier.

The present invention, generally, utilizes a fixture onto which a dielectric substrate, such as glass or plastic, in the form of a vehicle window, is positioned by manual or electromechanical means, e.g., a robot. The fixture can perform multiple functions; that is, one or more functions, in addition to positioning/disposing one or more items of hardware on the substrate, or it may serve one or more functions solely related to the positioning/disposing of one or more, items of hardware on the substrate. It is also within the scope of the invention to provide a workstation for positioning/disposing items of hardware on a substrate, which workstation is not a fixture.

In connection with the present invention, the item(s) of hardware to be disposed on the dielectric substrate may be pre-positioned in an assembly aid, or "nest," which may operate separately from, but in cooperation with, the fixture/workstation, or may be an integral component of such fixture/workstation.

In accordance with the invention, the preferred means of disposing the one or more items of hardware onto the substrate is by adhesive bonding. A one component adhesive is preferred. In order to minimize the cycle time as much as possible, heating of: the glass, the item of hardware, and/or the adhesive itself, separately or simultaneously, may be desirable. The inventors have found that while one or more methods of heating are possible, induction heating is preferred. In the apparatus of the invention, one or more induction heating coils can be deployed proximate the glass/adhesive/item of hardware. It is preferred that where multiple induction coils are utilized, the coils are independently powered, but controlled by a single master controller to maximize the flexibility of such induction heating system.

In another embodiment of the invention, a manufacturing process, whereby vehicle windows to which items of hardware are to be bonded, are transported by, for example, a continuous conveyor system to an "in-line" fixture including multi-axis glass positioning mechanisms and one or more assembly aids to hold the items of hardware to be bonded. The assembly aids may be movable from a bonding position beneath the vehicle window to a loading position proximate the conveyor system. A shuttle system may be useful to move the one or more assembly aids between such loading and bonding positions.

BRIEF DESCRIPTION OF THE DRAWINGS

The above, as well as other advantages of the present invention, will become readily apparent to those skilled in the art from the following detailed description when considered in the light of the accompanying drawings in which:

FIG. 2b shows a cross-sectional view of an assembly aid as in FIG. 2, but with multiple induction heating devices, as is within the scope of the invention.

DETAILED DESCRIPTION OF THE INVENTION

Figure 1A:
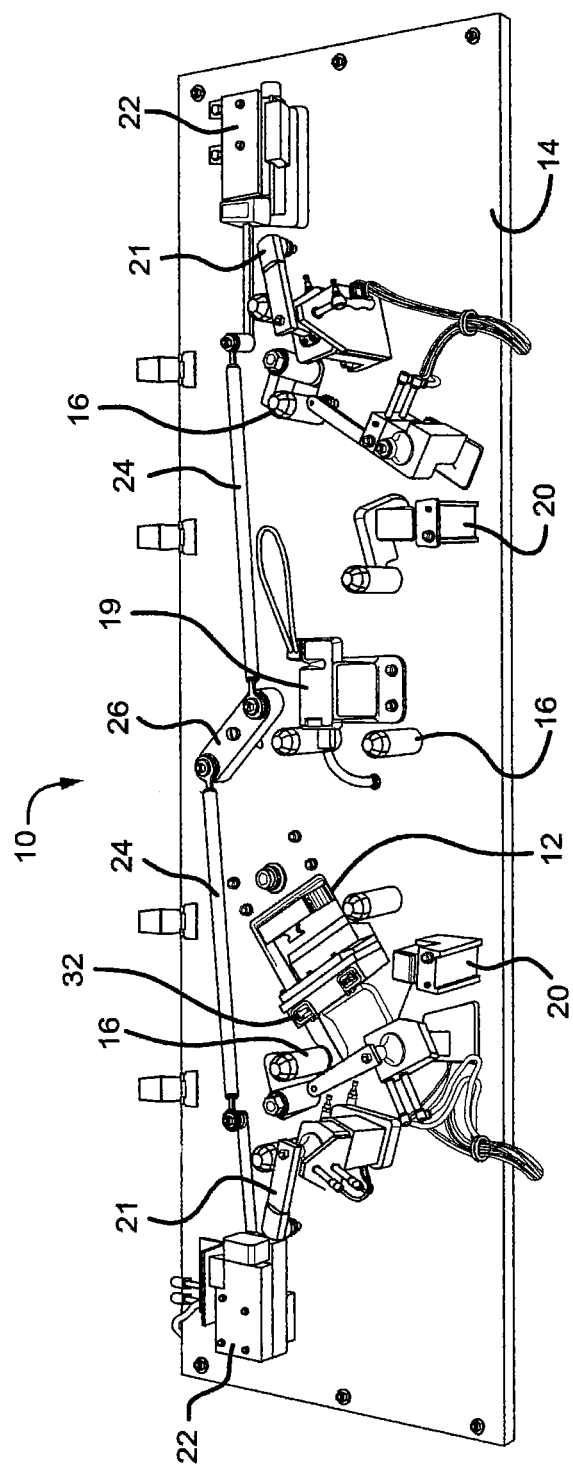
FIG. 1a-1b show perspective views of the assembly fixture with assembly aids without and with a vehicle window disposed thereon, respectively, according to the invention.

As previously mentioned, the invention can be implemented in a manufacturing process for bonding hardware to a substrate, preferably a glass vehicle window, by induction heating with or without the use of a fixture.

Induction heating is the process of heating an object having some degree of electrical conductivity by electromagnetic induction. Eddy currents are generated in the conductive material and electrical resistance leads to heating of the conductive material. An induction heating device as referred to herein comprises an electromagnet through which high frequency alternating current (AC) is passed.

In accordance with an embodiment of the invention, bonding an item of to a glass vehicle window, utilizing a preferred apparatus, is accomplished by pre-positioning one or more items of hardware in one or more assembly aids or "nests" preferably integrated into a fixture which is preferably a part of a work cell. A predetermined amount of a suitable adhesive is preferably pre-applied to the item of hardware or may be applied to the item of hardware in the assembly aid; the glass vehicle window is properly positioned on the fixture and is preferably brought into bonding contact with the item of hardware which has been prepared for bonding. The induction heating system is activated proximate the item(s) of hardware to accelerate curing of the adhesive. As previously noted, the glass substrate, the item of hardware and/or the adhesive may be selectively heated. After a predetermined time sufficient for at least initial curing of the adhesive, the completed vehicle window assembly is removed from the fixture. The various operations of the method may be performed manually, by electromechanical means, e.g. by a robot, or by a combination of same, such as is known for work cells in a manufacturing operation.

Such a fixture, preferably with integrated assembly aids in a work cell, may be advantageously utilized for larger parts such as hinges, brackets and the like, where the cycle time is relatively slow due to the time necessary for at least partial curing of the adhesive to bond the item of hardware to the glass. In such cases, cure times will, typically, be longer than 30 seconds, with current adhesive technology.

In an aspect of the invention where a fixture is not utilized, a framework having a shape substantially similar to the shape of a vehicle window could be utilized as a platform from which one or more induction heating devices 32 could be extended, either above or below, for example, a glass sheet transporting system. Depending on the application, the induction heating devices 32 so disposed can be positioned to heat the item of hardware with adhesive already applied directly, or to heat an area of either major surface of the glass to facilitate bonding of an item of hardware thereto. It is an advantage of induction heating that heating sufficient for bonding may be direct or indirect, in this case, heating directly an area on the surface of the glass to which the item of hardware is to be bonded, or indirectly through the glass by heating of the major surface of the glass opposite that on which the item of hardware is to be bonded.

Figure 1B:
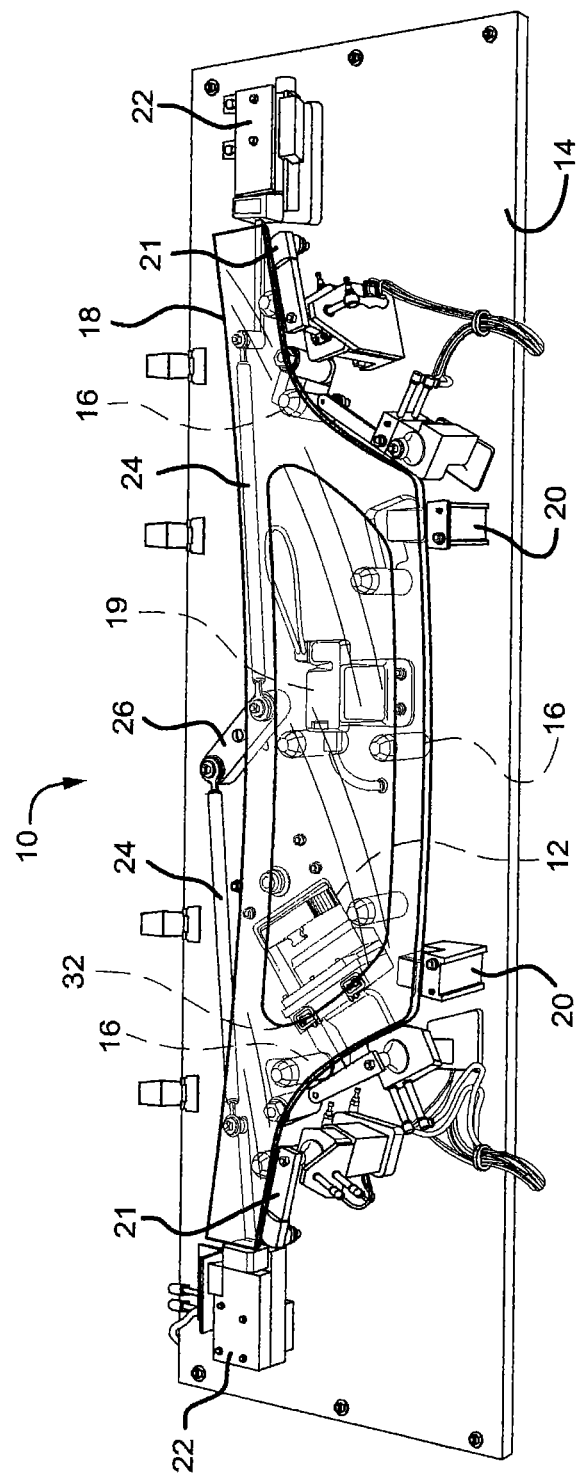

FIGS. 1a-1b show an assembly fixture 10 in accordance with the invention having at least one induction heating assembly aid as a component thereof.

Referring to FIGS. 1a and 1b, the assembly fixture 10 of the invention has a major, preferably substantially horizontal, support surface 14 with at least one preferably resilient, vertical support member 16 attached thereto. The at least one vertical support member 16 supports a vehicle window 18 a predetermined vertical distance above the major support surface 14. The at least one vertical support member 16 may have one or more passages extending therethrough, which can be connected to a source of gaseous pressure, preferably a source of negative pressure, for example a vacuum pump.

Also attached to the major support surface 14, and extending a predetermined vertical distance thereabove, is at least one fixed positioning member 20 to contact the peripheral edge of the vehicle window 18 so as to align the vehicle window in an "x" direction prior to adhesive bonding. To assist with aligning the vehicle window 18 in the "y" direction, moveable positioning members 22 may be utilized. Movement of the moveable positioning members is preferably caused by two or more horizontally extending arms 24 which connect the moveable positioning members to a centrally located camming mechanism 26 which is axially affixed to the major support surface 14, although other movement mechanisms are possible.

Other optional features of the assembly fixture as shown in FIGS. 1a and 1b include glass pressure sensor 19 and swing arm mechanisms 21 which when the glass is positioned on the assembly fixture for bonding operations exerts a positive pressure on the vehicle window to assist in maintaining the vehicle window's precise position on the assembly fixture.

Further, one or more assembly aids 12 are preferably affixed to the major support surface in a predetermined location, so as to coincide with the one or more locations of the vehicle window where an item of hardware is to be adhesively bonded. The item of hardware is typically metallic, and is preferably formed of steel. In preferred embodiments, the item or items of hardware may be one or more of clips, pins, brackets, hinges, rails or the like.

Figure 2:
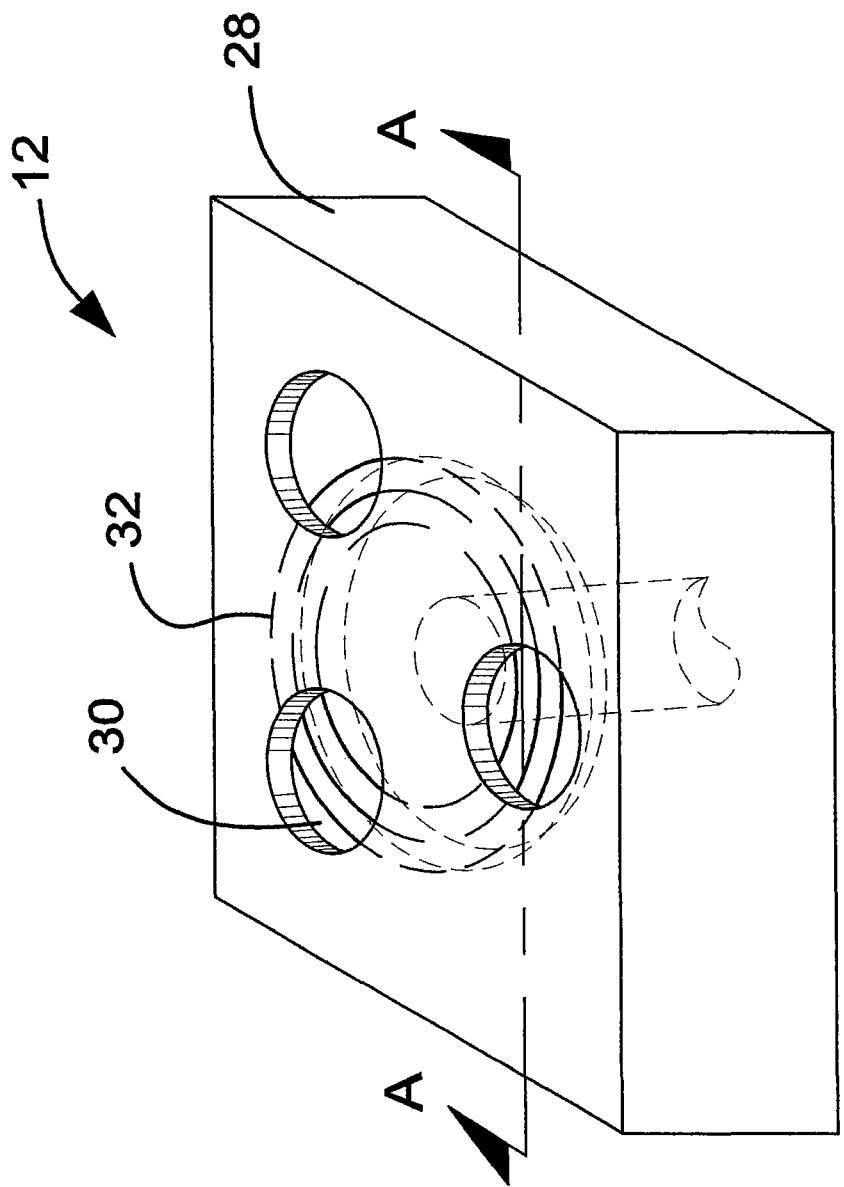
FIG. 2 shows a somewhat schematic view of an assembly aid according to the invention.
Figure 2A:
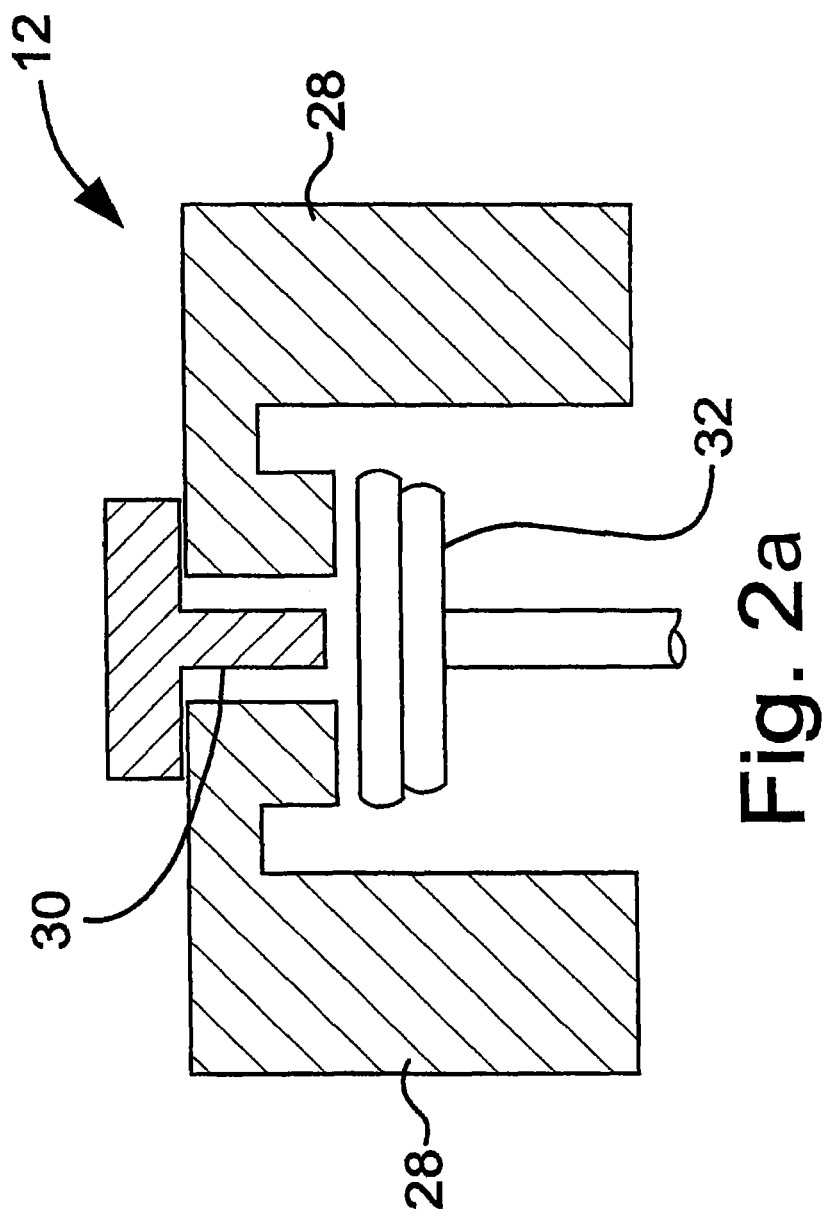
FIG. 2a shows a cross-sectional view of FIG. 2 along line A-A, according to the invention.

Generally, an assembly aid, illustrated in FIGS. 2, 2a and 2b, includes a block of temperature-resistant, preferably polymeric material 28, in which is formed a receptacle 30 for receiving one or more items of hardware. Preferably, embedded in the polymeric material 28 proximate the receptacle for the items(s) of hardware is one or more induction heating devices 32 and, if necessary, a cooling system (not shown) that typically employs water or air cooling. The induction heating devices 32 may also be proximate the assembly aid 12, but not embedded in the polymeric material 28. The assembly aid 12 may also be equipped with a spring-loaded or other type of device (not shown) to allow the assembly aid to move a predetermined distance in the "z" direction. This slight adjustability allows for, for example, variation in glass shape.

In a method of operation in accordance with an embodiment of the invention, a vehicle window 18 is placed onto the assembly fixture 10 by manual or electromechanical means, and is initially positioned on the one or more vertical supports 16 with one peripheral edge of the vehicle window 18 in contact with the at least one fixed positioning member 20 to aid in positioning the vehicle window in the "x" direction. Moveable positioning members 22 are activated to contact opposite peripheral edges of the vehicle window to ensure proper alignment of the vehicle window 18 in the "y" direction. If so equipped, a negative pressure may be applied through, for example, the at least one vertical support member 16, thus drawing the vehicle window 18 down so as to contact the surface of the assembly aid 12 and place the surface in communication with the at least one receptacle 30 containing the one or more items of hardware previously placed by manual or electromechanical means in the receptacle 30. Preferably, the one or more items of hardware have a predetermined amount of an adhesive, preferably a one component urethane adhesive, adhered thereto.

A one-component adhesive particularly suitable for use in connection with the invention is a polyurethane adhesive preferably including at least one polymer polyol, such as Terolan 1510™ by Henkel and Efbond™ by Eftec, and further including at least one physically unincorporated or chemically blocked polymerizing component, such as an isocyanate compound, well dispersed within the at least one polymer polyol. The polymerizing component may comprise a percentage of the overall adhesive, for example, 1 wt % to 50 wt % of the total adhesive. An advantage of the preferred adhesive is that it has an initial viscosity of from 10 kilocentipoise to 30 kilocentipoise and, unless subjected to heat at a temperature of 190 F or greater, will maintain a viscosity substantially within the range of the initial viscosity for an indefinite period of time. Thus, such material is pumpable, or otherwise readily deliverable by conventional systems to the desired location during the bonding process. A further advantageous feature of the preferred one component urethane adhesive is that upon exposure to heat at a temperature of 190 F or greater, the adhesives cures rapidly, and achieves a high bond strength quickly. For example, a bond strength of ≥100 psi by lap shear testing is achieved within a time period from 1 minute to 2 minutes, preferably a time period of 0.5 minute to 1 minute.

The one or more induction heating devices 32 are activated for a predetermined time through at least one electronic controller (not shown) which is connected to one or more power supply units (not shown) which, in turn, is connected to the at least one assembly aid 12. Activation of the one or more induction heating devices 32 creates heat sufficient to initiate curing of the adhesive on the portion of the item of hardware which is in contact with the surface of the vehicle window 18, for example, 5 sec to 45 sec. The induction heating devices 32 are then deactivated by the at least one electronic controller and, after a predetermined time sufficient for the adhesive to at least partially cure and bond the item of hardware to the vehicle window 18, the negative pressure is discontinued. The vehicle window 18 with item(s) of hardware bonded thereto can then be removed from the assembly fixture 10 for further processing, or for transport to, for example, a vehicle assembly plant.

It has been found that the implementation of induction heating requires a careful balance between the power of the induction heating device 32 and the time a given induction heating device 32 is activated for a particular heating operation.

More specifically, it has been discovered that rather than it being difficult to generate sufficient heat to cure an adhesive material by induction heating, it is more difficult to avoid overheating the adhesive, thereby actually diminishing the bonding strength of the adhesive and, of course, the strength of the adherence of the item of hardware to the surface of a glass vehicle window 18. This is clearly undesirable. It has been found that for most applications of the invention, utilizing an induction heating device 32 having an electrical frequency of between 10 KHz and 100 KHz is preferable, and between 20 KHz and 50 KHz is more preferable. It may be possible, however, to utilize an induction heating device 32 of somewhat higher frequency if a heating device in the preferred power range is not available, to achieve acceptable adhesive curing by "pulsing" the heating device 32; that is, activating the induction heating device 32 for a first predetermined period of time, deactivating the heating device 32, for a predetermined period of time, and then reactivating the induction heating device 32 for a second predetermined period of time. For example, a "pulsing" cycle, as described above, may have a duration of 2 sec. heating device 32 on and 2 sec. heating device 32 off, more preferably 1 sec. heating device 32 on and 1 sec heating device 32 off and most preferably 0.5 sec. heating device 32 on and 0.5 sec. heating device 32 off, for a total time of preferably 60 sec., more preferably a time of 45 sec. and most preferably a total time of 20 sec., although other pulsing cycles are possible.

Other reasons pulsing may be desirable include, as a means to gradually increase the temperature of the adhesive or the material to which the adhesive is to be bonded, or to maintain the adhesive or the substrate material at a predetermined temperature, or within a predetermined temperature range.

The "pulsing" of induction heating devices 32 can be utilized with multiple induction heating devices 32. It is also within the scope of the invention to utilize pulsing cycles of varying duration on different items of hardware being bonded to the same glass substrate 18. It is also possible to utilize pulsing of induction heaters 32 on one or more items of hardware being bonded to a glass substrate 18 while utilizing a single constant linear heating interval or a variable rate heating method (i.e., some power is continuously applied, but in a non-linear manner, for example, "ramp" type heating) for another item of hardware.

Figure 3:
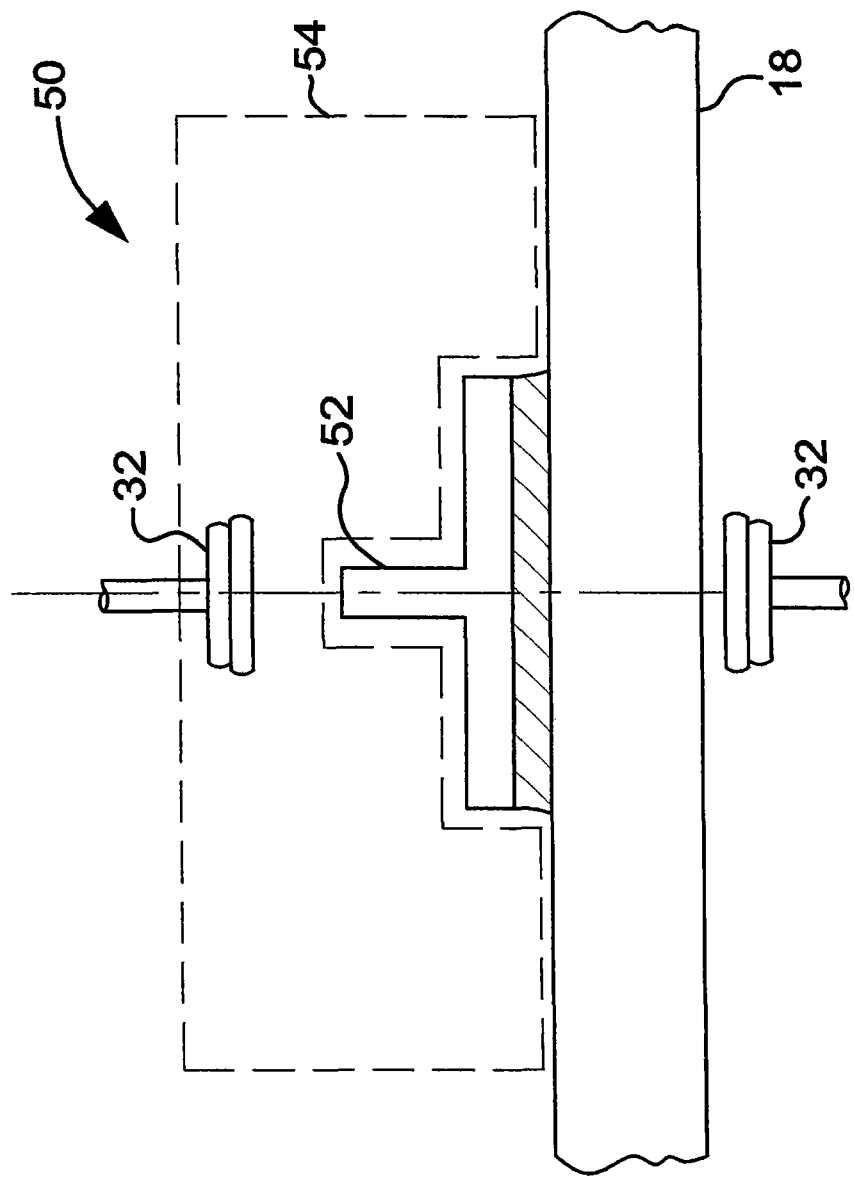
FIG. 3 is a cross-sectional view of a work station, not including a fixture, for induction bonding according to the invention.

FIG. 3 shows an embodiment of the invention for induction heating in an independent workstation environment; 50 that is, not as a component of an assembly 10 fixture, as elsewhere described herein. In this application, a mounting pin or pins 52, upon which some device may be subsequently installed, for example, a sensor farm housing 54, is adhesively bonded to a glass substrate 18. As illustrated, the mounting pin 52 may be manually or electromechanically positioned in bonding contact on a major surface of a glass substrate 18. The mounting pin 52 preferably has a pre-applied amount of a suitable adhesive on the portion of the mounting pin 52 in bonding contact with the glass substrate 18. Induction heating devices 32 are shown in two possible locations, one where the glass is heated to a temperature sufficient to activate the adhesive on the mounting pin 52, and/or a second induction heating device 32 positioned so as to directly heat the mounting pin 52 and activate the adhesive. While it would not likely be necessary in an application such as the one illustrated, both induction heating devices 32 could be energized substantially simultaneously to initiate bonding of the mounting pin 52 to the glass substrate 18. Pulsed operation of the one or more induction heating devices in the independent workstation 50 may also be employed.

As with the assembly fixture embodiment of the present invention, operation of the workstation 50 embodiment can also occur through use of manual means, electromechanical devices, or a combination thereof.

Figure 4:
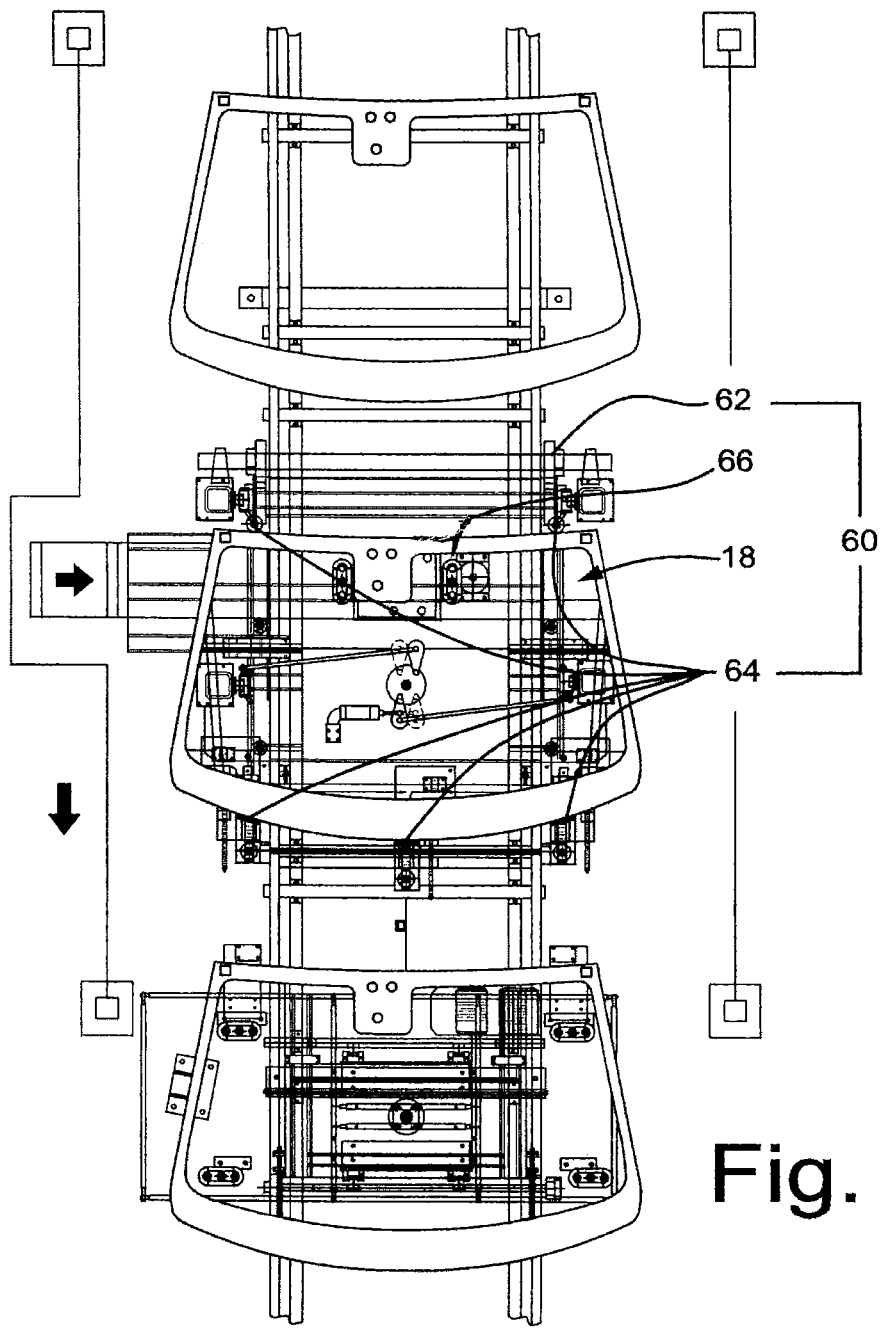
FIG. 4 is a plan view of a continuous manufacturing process utilizing the method of positioning and heating an item of hardware according to the invention.

FIG. 4 illustrates an embodiment of the invention which may be particularly advantageous for bonding smaller parts to glass, for example, pins, studs, clips and the like. In the illustrated embodiment, rather than having an individual work cell which includes an assembly fixture 60, the assembly fixture is 60 utilized as an "in-line" component of a manufacturing process whereby vehicle windows 18 to which hardware is to be bonded is transported to and away from the "in-line" fixture by, for example, a continuous conveyor system 62. Such conveyor system 62 may be any suitable type of conveyor system, for example, a roller conveyor as illustrated in FIG. 4. At the "in-line" assembly fixture 60, it is desirable to have mechanisms for example, centering device 64 to precisely position the vehicle window 18 relative to the assembly fixture 60 in an x and y axis, that is, in the direction parallel to and perpendicular to the direction of the conveyor 62. Some degree of movement of the vehicle window 18 in a z-axis direction may also be desirable to allow the window 18 to be drawn down into bonding contact with the one or more items of hardware to be bonded to the vehicle window 18. It is preferred that the one or more items of hardware to be bonded to the vehicle window 18 are held in an integrated assembly aid 66 substantially similar to the type previously described herein.

It is also possible, however, to have the one or more assembly aids 66 be a separately movable component which can be moved in, for example, a "y" direction between a loading position, proximate the transport conveyor 62 to a bonding position proximate the in-line fixture 60. In the bonding position the assembly aid 66 may be capable of movement in a "z" direction to bring one or more items of hardware into bonding contact with a vehicle window 18 positioned in the in-line fixture 60. Of course the assembly aid 66 preferably also includes one or more induction heating devices 32 positioned so as to heat the item of hardware, the glass of the vehicle window 18, or both, to initiate curing of the adhesive utilized to bond the item of hardware to the vehicle window 18. The induction heating devices 32 may also be a component of the in-line fixture 60, rather than being incorporated into the assembly aid 66.

In the loading position, the movable assembly aid may be loaded with one or more items of hardware to be bonded. Such items of hardware may have had a predetermined amount of adhesive previously applied to the bonding surface thereof, or a predetermined amount of adhesive might be applied subsequent to the items of hardware being loaded in the movable assembly aid.

As previously noted, the in-line fixture 60 is typically utilized for small parts which, generally, have shorter adhesive curing times, found by the inventors, to be on the order of 25-30 seconds. In order to have an optimized manufacturing process with a minimum cycle time relative to the cure time of the adhesive, it is preferable to be able to convey vehicle windows 18 to the in-line fixture 60 at a rate not currently possible with the work cell type fixture 50 previously described herein, for example, 30 parts/hr to 120 parts/hr.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of bonding an item of hardware to a glass substrate to form a vehicle window assembly, comprising:
    transporting the glass substrate on a continuous conveyor to an assembly fixture;
    supporting the glass substrate on an upper surface of the assembly fixture;
    bringing a surface of the item of hardware into bonding contact with a surface of the glass substrate with an adhesive material interposed between the surface of the item of hardware and the surface of the glass substrate; and
    while the glass substrate is supported on the upper surface of the assembly fixture, activating one or more induction heating devices to heat one or more of the glass substrate, the item of hardware, and the adhesive material; thereby bonding the item of hardware to the glass substrate.

2. The method defined in claim 1, wherein two or more individually controlled induction heating devices are activated to heat the one or more of the glass substrate, the item of hardware, and the adhesive material.

3. The method defined in claim 1, wherein a source of negative pressure is applied to the item of hardware or the glass substrate to bring the surface of the item of hardware into bonding contact with the surface of the glass substrate.

4. The method defined in claim 1, wherein the adhesive material comprises a one component urethane adhesive.

5. The method defined in claim 1, wherein the item of hardware is a clip, pin, bracket, hinge, or rail.

6. The method defined in claim 1, wherein the one or more induction heating devices are activated at an electrical frequency of between 10 KHz and 100 KHz.

7. The method defined in claim 1, wherein the one or more induction heating devices are activated at an electrical frequency of between 20 KHz and 50 KHz.

8. A method for forming a vehicle window assembly comprising:
    providing a continuous conveyor system;

beneath and proximate the continuous conveyor system, providing an assembly fixture;

on or proximate to an upper major support surface of the assembly fixture, providing one or more assembly aids having located in or proximate to the one or more assembly aids one or more induction heating devices;

providing at least one power supply unit electrically connected to the assembly fixture, the assembly aids and the conveyor system;

providing at least one electronic controller electrically connected to the at least one power supply unit;

loading one or more items of hardware into predetermined locations in the assembly aids to which item of hardware a predetermined amount of an adhesive material has been applied;

activating the continuous conveyor system;

placing a plurality of vehicle windows a predetermined distance apart on the moving continuous conveyor system;

stopping the conveyor system so that a single vehicle window is located above the assembly fixture for a predetermined time;

activating one or more positioning members to precisely locate the vehicle window relative to the assembly fixture;

moving the assembly fixture vertically upward and/or the vehicle window vertically downward so as to bring the one or more items of hardware positioned in the assembly aids into bonding contact with a major surface of the vehicle window;

activating the one or more induction heating devices to heat the item of hardware and/or the portion of the vehicle window to which the item of hardware is to be bonded to a predetermined temperature for a time sufficient to at least initiate curing of the adhesive material;

moving the assembly fixture vertically downward and/or the vehicle window vertically upward; and re-activating the continuous conveyor system to move the vehicle window with one or more items of hardware bonded thereto away from the assembly fixture.

9. A method for forming a vehicle window assembly comprising:

providing an assembly fixture having a major upper support surface, the major upper support surface having one or more assembly aids proximate thereto, the assembly aids having located in them, or proximate to them, one or more induction heating devices;

providing one or more resilient support members affixed to the major support surface and extending a predetermined vertical distance thereabove and having one or more openings extending therethrough and connected to a source of negative pressure;

providing at least one power supply unit electrically connected to the one or more induction heating devices;

providing at least one electronic controller electrically connected to the at least one power supply unit;

loading one or more items of hardware having a predetermined quantity of an adhesive material adhered thereto, into the assembly aids, so such items of hardware extend a predetermined distance above the major upper support surface;

placing a vehicle window into supporting contact with the one or more resilient support members;

precisely positioning the vehicle window on the assembly fixture by utilizing at least one fixed positioning member and at least one movable positioning member;

applying a negative pressure through the one or more openings in the one or more resilient support members to the vehicle window sufficient to draw a major surface thereof into contact with the adhesive material on the one or more items of hardware in the assembly aids;

activating the power supply via the controller so as to cause the one or more induction heating devices in or proximate to the one or more assembly aids to heat to a predetermined temperature for a predetermined period of time sufficient to cure the adhesive material on the one or more items of hardware;

allowing the item of hardware and the adhesive material to cool for a predetermined time so as to allow a bond to form between the item of hardware and the major surface of the vehicle window, and removing the vehicle window assembly from the assembly fixture.

10. The method defined in claim 9, wherein the adhesive material comprises a one component urethane adhesive.

11. The method defined in claim 9, wherein the item of hardware is a clip, pin, bracket, hinge or rail.

12. The method defined in claim 9, wherein the one or more induction heating devices are activated at an electrical frequency of between 10 KHz and 100 KHz.

13. The method defined in claim 9, wherein the one or more induction heating devices are activated at an electrical frequency of between 20 KHz and 50 KHz.

14. The method defined in claim 9, wherein the one or more induction heating devices are operated in a mode such that the induction heating device is activated for a first predetermined period of time, then is deactivated for a predetermined period of time, and is then reactivated for a second predetermined period of time, and further wherein such cycle of activation, deactivation and reactivation may be repeated as desired.

* * * * *